United States Patent
Barnes et al.

[11] 4,323,899
[45] Apr. 6, 1982

[54] POLARIZATION DETECTOR

[75] Inventors: Richard M. Barnes, Acton; George M. Vachula, Harvard, both of Mass.

[73] Assignee: Sperry Corporation, New York, N.Y.

[21] Appl. No.: 161,798

[22] Filed: Jun. 23, 1980

[51] Int. Cl.³ .............................................. G01S 13/02
[52] U.S. Cl. ........................... 343/55 A; 343/100 PE
[58] Field of Search ....................... 343/55 A, 100 PE

[56] References Cited

U.S. PATENT DOCUMENTS

| | | | |
|---|---|---|---|
| 3,234,547 | 2/1966 | Katzin | 343/100 PE X |
| 3,689,924 | 9/1972 | Caruso, Jr. | 343/100 PE X |
| 3,772,689 | 11/1973 | Root, Jr. | 343/55 A X |
| 4,001,820 | 1/1977 | Rosenbaum et al. | 343/55 A |
| 4,053,882 | 10/1977 | Van Etten | 343/55 A |
| 4,106,015 | 8/1978 | Beguin et al. | 343/100 PE X |

*Primary Examiner*—Malcolm F. Hubler
*Attorney, Agent, or Firm*—Howard P. Terry; Terry J. Ilardi

[57] ABSTRACT

An apparatus and method for detecting the polarization of signals reflected from targets immersed in clutter. Signals reflected from targets illuminated with quasimonochromatic electromagnetic signals such as FMCW radar are received by antennas responsive to orthogonally polarized components of the reflected signals. These received orthogonal signal components are then analyzed in a processor which detects the polarization of the reflected signal by estimating the Stokes parameters for the reflected signal. The estimated Stokes parameters may then be used to generate detection criteria that are compared to a predetermined threshold level. The presence of the target is indicated when the detection criteria level exceeds the level of the predetermined threshold.

13 Claims, 3 Drawing Figures

POLARIZATION DETECTOR

BACKGROUND OF THE INVENTION

1. Field of the Invention

This invention pertains to the art of radar detection and more specifically to a radar detection system and technique for detecting a target immersed in clutter utilizing the polarization of a signal reflected from the target.

2. Description of the Prior Art

It is well known in the art that a polarized signal incident upon clutter will become depolarized on reflection. Prior art techniques have considered the use of polarization information to enhance target detection and clutter discrimination. In U.S. Pat. No. 3,772,689, a method is disclosed in which the amplitude maxima and minima of the reflected signal are noted as the polarization of the incident signal is varied. The amount of polarization variation for a maximum ratio of echo amplitudes is representative of the complexity of the illuminated target. Such a system, while utilizing polarization information does not develop a sufficient detection statistic nor does it minimize the effects of clutter. Thus a method is sought with which the polarization information contained in a reflected radar signal may be completely characterized.

Polarization of signals received by a radar system may be utilized to describe the polarization characteristics, known as Stokes parameters. In the past, Stokes parameters have been used to describe the polarization of optical frequency signals. A description of such use is presented by Born & Wolf, "Principles of Optics", McMillan Company, 1964, (pages 30–32 and 544–545). The present invention provides an apparatus which utilizes the Stokes parameters of a returned radar signal to enhance the detection of a radar target immersed in clutter.

SUMMARY OF THE INVENTION

The invention is a detection apparatus and method which examines the polarization of reflected target signals immersed in clutter. A receiver having channels responsive to a multiplicity of polarization components provides output signals representative of each such component. These channels are coupled to a signal processor wherein the representative signals are processed to extract characteristic polarization parameters of the reflected signal. Signals representative of the characteristic polarization parameters are generated and compared with a predetermined threshold to establish the presence of a target.

DESCRIPTION OF THE PREFERRED EMBODIMENT

Figure 1A:
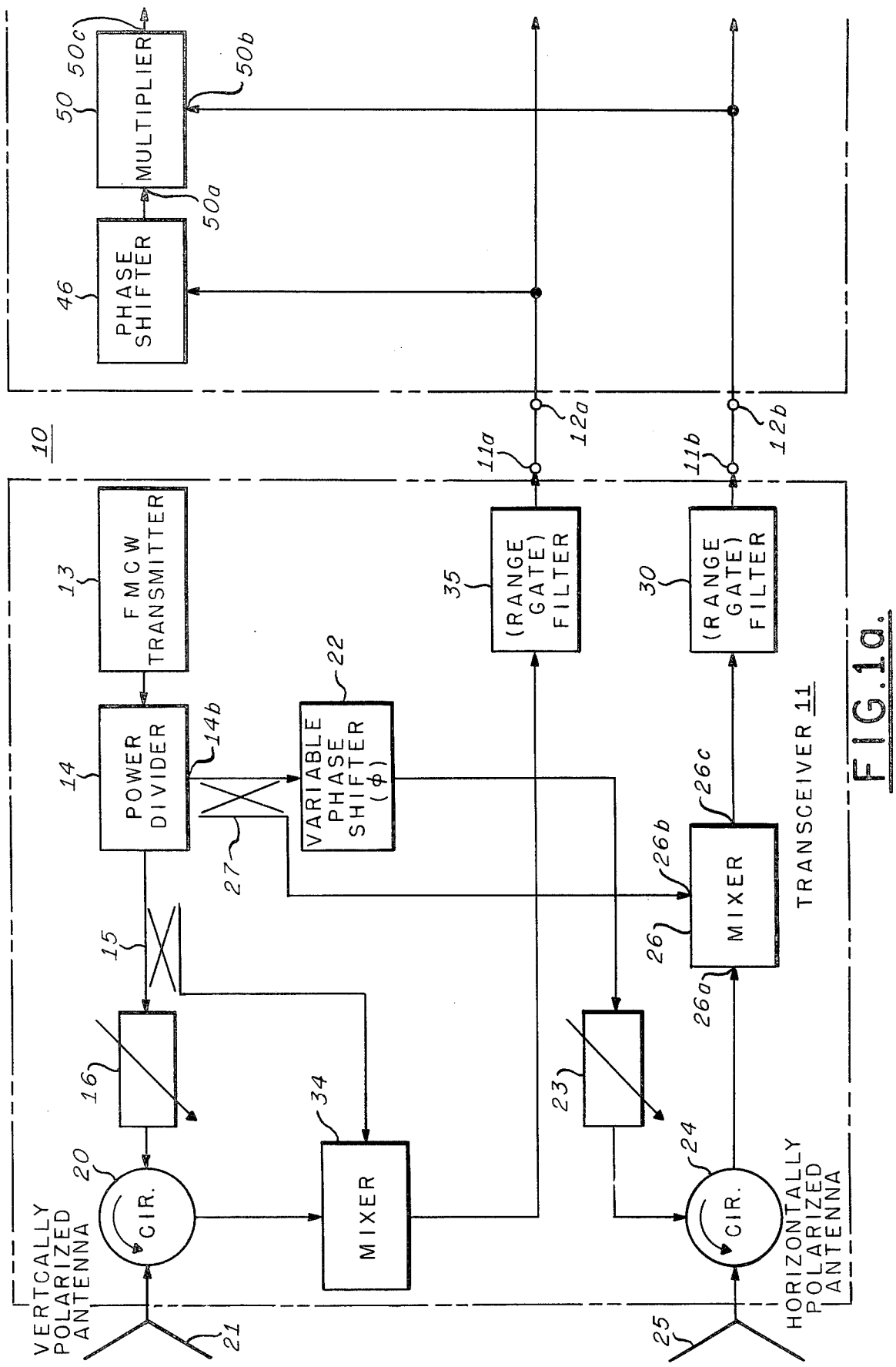
FIG. 1A and 1B is a block diagram of a polarization detector in accordance with the present invention.

Referring to FIG. 1A, a radar target polarization detector 10 may comprise a transceiver 11, a processor 12, a threshold detector 54, and an indicator means 55. The transceiver 11 may include a frequency modulated continuous wave (FMCW) transmitter 13 coupled to an input terminal of a power divider 14, an output terminal of which may be coupled to an attenuator 16 and an input terminal of a mixer 34 via a directional coupler 15. Attenuator 16 may be coupled to an antenna 21, the antenna 21 being also coupled to mixer 34 via circulator 20, the output terminal of mixer 34 being coupled to transceiver output terminal 11a via filter 35. A second output terminal of power divider 14 may be coupled to the input terminal of a variable phase shifter 22, the output terminal of which may be coupled to the input terminal of an attenuator 23, the output terminal of which may be coupled to a second antenna 25 via circulator 24. Antenna 25 may also be coupled via circulator 24 to the input terminal 26a of mixer 26, a second input terminal 26b of which may be coupled to output terminal 14b of power divider 14 via directional coupler 27. Output terminal 26c of mixer 26 may in turn be coupled to an input terminal of filter 30, the output terminal of which is coupled to transceiver output terminal 11b.

Processor 12 is coupled at its input terminals 12a and 12b to transceiver output terminals 11a and 11b, respectively. Input terminal 11b may in turn be coupled to detector 31 which is coupled to squaring circuit 38, the output terminal of which is coupled to the input terminal of integrator 32. The output terminal of integrator 32 is coupled to input terminal 33b of summer 33 and positive input terminal 41b of subtracter 41. Similarly, transceiver output terminal 11a is coupled to detector 36, the output terminal of which is coupled to squaring circuit 37 with the output terminal coupled to the input terminal of integrator 40. The output terminal of integrator 40 is coupled to input terminal 33a of summer 33 and negative input terminal 41a of subtracter 41. Processor input terminals 12a and 12b are further coupled to terminals 42a and 42b, respectively, of multiplier 42. Output terminal 42c of multiplier 42 may be coupled to filter 43, the output terminal of which is coupled to the input terminal of amplifier 44, the output terminal thereof being coupled to the input terminal of integrator 45. Processor input terminal 12a may also be coupled to phase shifter 46, the output terminal of which is coupled to the input terminal 50a of multiplier 50. Processor input terminal 12b may additionally be coupled to input terminal 50b of the multiplier 50, while the output terminal 50c thereof is coupled to amplifier 52 via filter 51, with the output terminal of amplifier 52 coupled to the input terminal of integrator 53. The output terminal of summer 33, subtracter 41, integrator 53 and integrator 45 are coupled to threshold detector input terminals 54a, 54b, 54c and 54d, respectively of threshold detector 54, the output terminal of which is coupled to indicator means 55.

The transceiver 11 performs the functions of both a dual input receiver and dual output transmitter. FMCW transmitter 13 generates a linear FM signal that is coupled to antennas 21 and 25 which may have polarizations that are substantially orthogonal to each other. For the purposes of discussion, antenna 21 will be considered vertically polarized and antenna 25 horizontally polarized. The relative phase and amplitude of the signal applied to the vertically polarized antenna 21 and horizontally polarized antenna 25 can be varied, allowing the user to transmit a signal with any elliptical polarization desired. It should be noted that many different antenna and signal feed configurations may be used, and that the configuration described is but one of these many configurations. FMCW transmitter 13 generates a linear FM signal with a time duration T that exceeds the signal round-trip time delay Δt required for the signal to be transmitted from the antennas 21 and 25, reflected from the target, and received by antennas 21 and 25. This linear FMCW signal is coupled to power divider 14 from which linear FM signals are coupled to vertically polarized antenna 21 via attenuator 16 and circulator 20 and to horizontally polarized antenna 25 via attenuator 23 and circulator 24. Attenuators 16 and 23 are used to vary the amplitude of the signal applied to vertically polarized antenna 21 and horizontally polarized antenna 25, respectively. Alternatively, power divider 14 may be constructed to vary the power applied to each antenna. The linear FM signal coupled to the horizontally polarized antenna 25 may be shifted in phase by phase shifter 22 to provide a phase difference between the signals coupled to antennas 21 and 25. This phase difference and the amplitude ratio provided by attenuators 16 and 23 may be chosen such that horizontal and vertical components of the transmitted wave establish any desired elliptical polarization. It should be noted that linear and circular polarizations are merely special cases of elliptical polarization.

Figure 2:
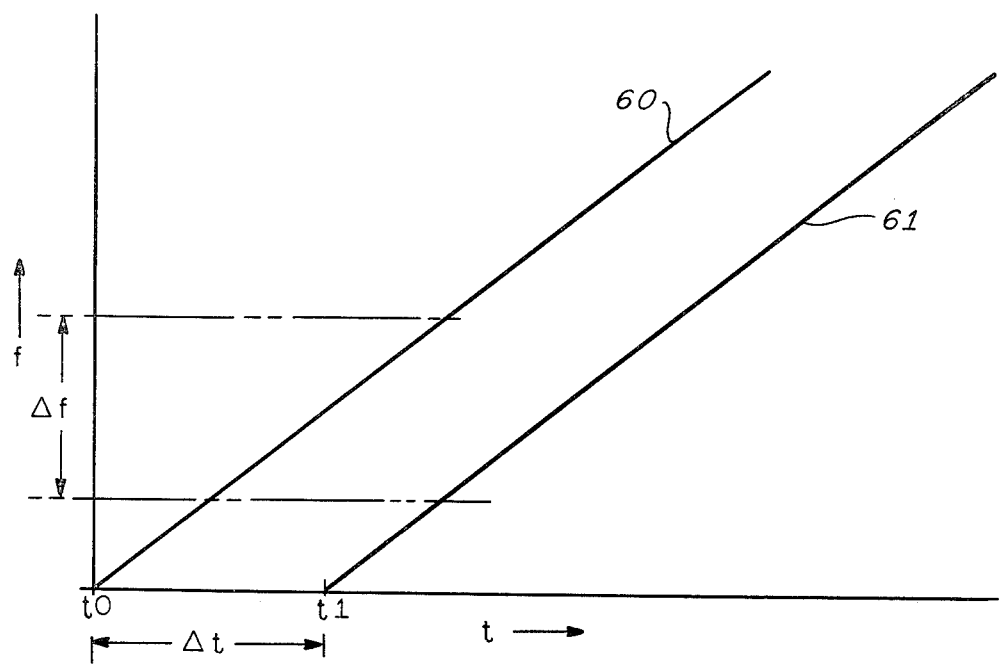
FIG. 2 is a graph of a waveform useful in explaining the operation of the invention.

Antennas 21 and 25 will be responsive to the vertically and horizontally polarized components, respectively, of a signal reflected from a target. Considering the reception of the vertically polarized signal first, antenna 21 will be energized by the vertically polarized signal component of the reflected linear FM signal, which through circulator 20 is coupled to mixer 34, to which a portion of the transmitted linear FM signal is coupled via directional coupler 15. The signals coupled to mixer 34 are heterodyned therein to provide a signal frequency that is a function of the time delay between the transmitted and received signal, as will be explained. Refer now to FIG. 2, the frequency versus time characteristic of the transmitted signal 60 generated by FMCW transmitter 13 and the signal reflected from an illuminated target 61 are shown as they appear at the input terminals of mixer 34. The time delay $\Delta t$ is the time required for the transmitted signal to propagate through space from antenna 21, reflect back from the illuminated target and be received by antenna 21. Thus, if the transmitted signal 60 begins at time $t_0$, the reflected signal will not appear at the input to mixer 34 until time $t_1$, where $t_1 - t_0 = \Delta t$. Since the transmitted, and consequently the reflected signal has a linear frequency versus time characteristic, there will be a constant frequency difference $\Delta f$ between the transmitted signal 60 and reflected signal 61. The mixer 34 will produce both sum and difference frequencies of which either frequency may be selected. Filter 35 may be of the form of a narrow band filter which can be adjusted to different center frequencies and thereby function as a range gate. As previously described, the frequency $\Delta f$ produced by mixer 34 is dependent upon the distance d the transmitted signal must travel before it is reflected and received by antenna 20 and can be expressed as follows:

$$d = \frac{\Delta f}{2BW} cT \qquad (1)$$

where
  d = the distance between the antenna and the illuminated target.
  $\Delta f$ = the difference between the transmitted and received signal frequencies.
  BW = the bandwidth of the transmitted linear FM signal.
  c = free space propagation velocity.
  T = the period of the linear FM signal.

Thus, by adjusting the center frequency $F_c$ of filter 35 to pass only a certain limited band of frequencies centered at $\Delta f$, the output signal $E_v(t)$ may be chosen to correspond to the amplitude and phase of targets at a specific predetermined distance according to the above equation. Antenna 25, circulator 24, coupler 27, mixer 26 and filter 30, operate in an identical manner to the operation of antenna 21, circulator 20, coupler 15, mixer 34 and filter 35, respectively. However, horizontally polarized antenna 25 is responsive only to the horizontal signal component of the received signal, and therefore the output signal $E_h(t)$ of filter 30 will correspond to the amplitude and phase of the horizontal signal component of the reflected FM signal. The output signals of filters 35 and 30 may be represented by the equations $E_v(t) = A_v(t) \sin(\omega t + \phi_v(t))$ and $E_h(t) = A_h(t) \sin(\omega t + \phi_h(t))$, respectively, where $A_h(t)$ equals the amplitude of the received signal's horizontally polarized component, $A_v(t)$ equals the amplitude of the received signal's vertically polarized component, $\omega = 2\pi \Delta f$, $\phi_v(t) =$ the phase angle of the vertically polarized component, and $\phi_h(t)$ equals the phase angle of the horizontally polarized component. Both $\phi_v(t)$ and $\phi_h(t)$ are referenced to an arbitrary but unknown phase, however, it is the phase difference, $\phi_h(t) - \phi_v(t)$ rather than the absolute phase of the received signals that is important to the operation of the apparatus.

It should be recognized by those skilled in the art that reflections from a target, illuminated with a polarized wave, regardless of how complicated, will be far less depolarized than reflections from any surrounding clutter.

If a linear FMCW radar signal is incident on a target, the polarization of the return signal cannot, in general be described in the same way as for a monochromatic signal. Since it is commonly the case that the target response depends on the frequency of the illuminating signal, which is a linear function of time for FMCW radar, the polarization transforming characteristics of the target will be time dependent. The reflected electromagnetic wave component amplitudes and phases therefor, will also be time dependent and can be written as follows:

$$E_h(t) = A_h(t) \cos(\omega_o t + \phi_h(t)) \hat{h} \qquad (2)$$

$$E_v(t) = A_v(t) \cos(\omega_o t + \phi_v(t)) \hat{v} \qquad (3)$$

If the bandwidth of the received time dependent functions $A_h(t)$, $A_v(t)$, $\phi_h(t)$ and $\phi_v(t)$ is small when compared with $\omega_o$, then $E_h(t)$ and $E_v(t)$ are said to be quasimonochromatic or narrow band. The polarization of a quasimonochromatic signal cannot be defined in terms of time independent component amplitudes and relative phases as in the monochromatic case. Either a time dependent polarization or an average polarization must be considered. In the instant invention, the latter approach is taken and polarization is defined in terms of the average quantities known as Stokes parameters, which were first introduced to describe the polarization of optical frequency signals.

The Stokes parameters are average quantities, estimates of which can be generated from the received components of a quasimonochromatic plane wave. The actual Stokes parameters are defined in terms of the amplitudes $A_h(t)$ and $A_v(t)$, and the phases $\phi_h(t)$ and $\phi_v(t)$ of the signals given in equations (2) and (3), as follows:

$$s_0 = E[A_h^2(t)] + E[A_v^2(t)] \quad (4)$$

$$s_1 = E[A_h^2(t)] - E[A_v^2(t)] \quad (5)$$

$$s_2 = 2E[A_h(t)A_v(t) \cos(\phi_h(t) - \phi_v(t))] \quad (6)$$

$$s_3 = 2E[A_h(t)A_v(t) \sin(\phi_h(t) - \phi_v(t))] \quad (7)$$

where $E[\cdot]$ denotes an ensemble average. Under ergodic conditions, assumed here, ensemble averages may be approximated by time averages, which are denoted by the symbol $<\cdot>$. The use of time averaging will permit the determination of good estimates of the Stokes parameters, and will be used hereinafter.

$s_0$ is the sum of the envelopes of the $\hat{h}$ and $\hat{v}$ plane wave E-field components and physically represents the total intensity or power of the received signal. $s_1$, $s_2$ and $s_3$, as opposed to being sum quantities, are difference quantities. $s_1$ is the difference between the intensities of the $\hat{h}$ and $\hat{v}$ E-field components, while $s_2$ is the difference in the intensities of two orthogonal E-field components whose axes are rotated 45° relative to the $\hat{h}$ and $\hat{v}$ axes components used to calculate $s_0$ and $s_1$. The quantity $s_3$, which can be shown to be equal to the difference between the intensities of the right hand circular and the left hand circular component E-field components, may be determined from the product of the $\hat{h}$ and $\hat{v}$ field components when the phase angle of the $\hat{v}$ component has been shifted by $\pi/2$ relative to the $\hat{h}$ component. Because of the $\pi/2$ phase shift of one component, $s_3$ is a measure of the circularly polarized power of the received signal.

A target that returns a circularly polarized signal will have all of its information in $s_3$, because $s_1$ and $s_2$, which measures differences in linear polarization signals, are zero. Since the phase difference between the components used to calculate $s_1$ and $s_2$ is zero, it may be expected that a target whose reflected signal is linearly polarized will have all its information in $s_1$ and $s_2$, while $s_3$ will be zero.

It is possible to choose detection criteria that are functions of the received signal, and can be applied to a simple threshold device to faithfully detect the presence of a target in a clutter environment. Using such detection criteria, a threshold may be chosen for a specified probability of false alarm ($P_{fa}$). Certain detection criteria (e.g. degree of polarization and $s_3/s_0$), enable a constant false alarm rate (CFAR) for arbitrarily chosen power levels, to be achieved.

Various detection criteria can be used. One such detection criterion is the degree of polarization. For a real target, such as a tank or an airplane, $s_1$, $s_2$ and $s_3$ will all be, in general, non-zero, i.e., the reflected signal need not be circularly or linearly polarized. It can be elliptically polarized or need not be polarized at all. A quasimonochromatic signal can be unpolarized or partially polarized. With the use of Stokes parameters, it is possible to describe the state of polarization of a signal reflected from an irregularly shaped object. This may be done with the aid of a quantity P, called the degree of polarization. The degree of polarization, defined in terms of the Stokes parameters is:

$$P = \sqrt{\frac{s_1^2 + s_2^2 + s_3^2}{s_0}} \quad (8)$$

Physically it is the ratio of the polarized power in the received signal to the total power in the received signal. It is therefore a real number whose range is the interval zero to one. When P=0, the signal is said to be unpolarized while, when P=1, it is said to be completely polarized. A signal whose Stokes parameters produce a P∈(0,1) is said to be partially polarized.

Detection criteria such as $s_3/s_0$ and $s_0+s_3$ may be employed to establish a detection threshold. Those skilled in the art will recognize that many other detection criteria having Stokes parameters as their basis, are possible.

It should be noted that strictly monochromatic radar signals could also be transmitted and the Stokes parameters of the reflected wave determined.

It should also be noted that while FMCW radar is proposed for use in the preferred embodiment, those skilled in the art will appreciate that pulsed radar may be successfully used to provide the quasimonochromatic signals needed to minimize the effects of clutter.

Figure 1B:
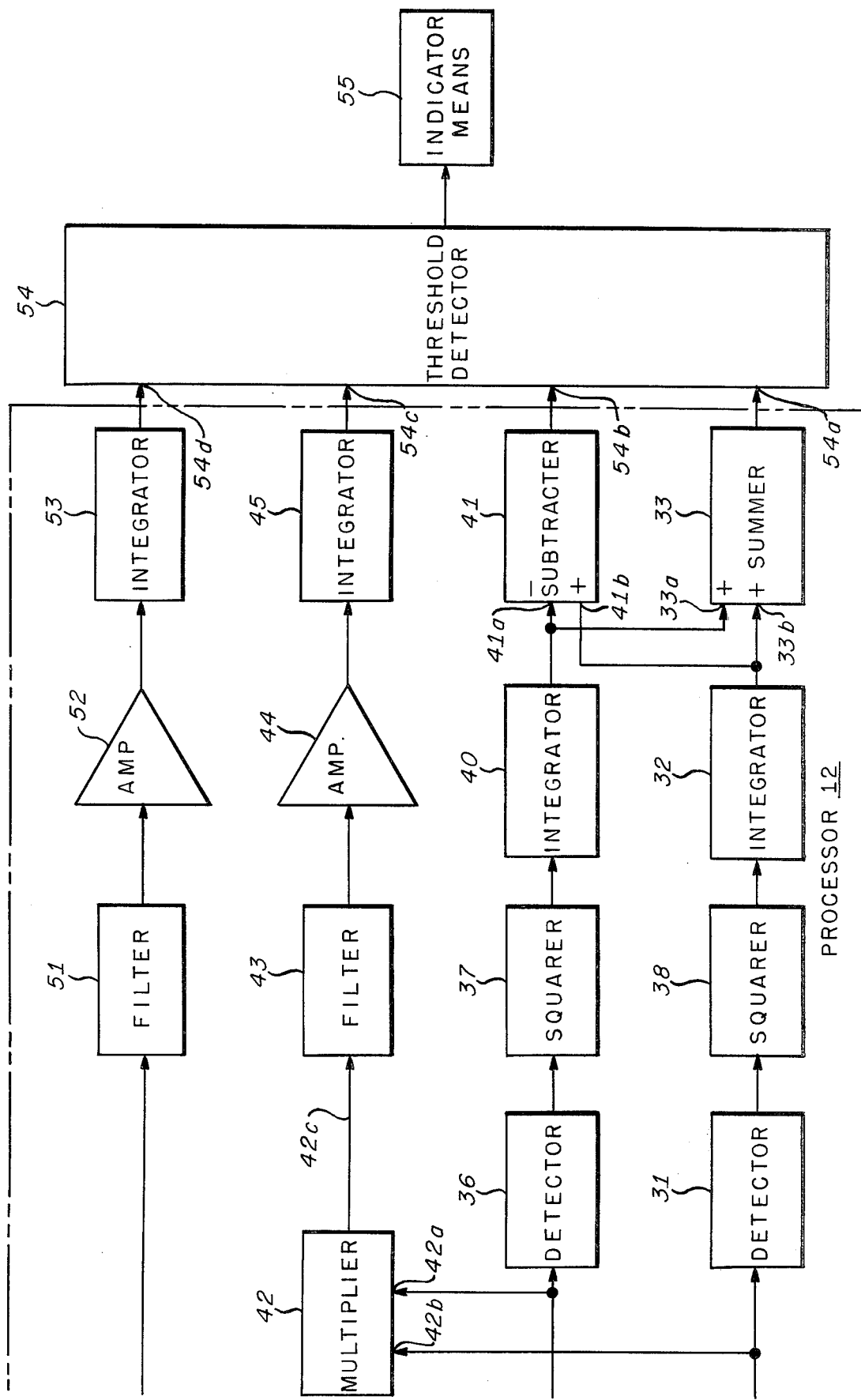

Refer again to FIG. 1A and FIG. 1B. Processor 12 is used to estimate the Stokes parameters from the signals applied to input terminals 12a and 12b. Considering the parameters $s_0$ and $s_1$, the signals available at input terminal 12a corresponding to the vertically polarized signal and from input terminal 12b corresponding to the horizontally polarized signal are each coupled to squaring circuits 37 and 38, respectively. The output signal of the squaring circuit 37 will be equal to $A_v^2(t)$ and the output signal of squaring circuit 38 will equal $A_h^2(t)$. In practice, each detector and its associated squaring circuit may be realized by a square law detector. The output signal of squaring circuit 37 is then coupled to integrator 40 which integrates the $A_v^2(t)$ term over time yielding $<A_v^2(t)>$. Likewise, the output signal of squaring circuit 38 is coupled to integrator 32, the output signal of which will equal $<A_h^2(t)>$ corresponding to the integration of $A_h^2(t)$ over time. Since the signal reflected from clutter tends to be randomly polarized, an increase in integration over time will reduce, the random effects of the clutter in estimating the Stokes parameters.

The outputs of integrators 40 and 32 are added in summer 33, whose output signal will then equal $<A_v^2(t)> + <A_h^2(t)> = s_0$. Additionally, the output signal of integrator 40 is subtracted from the output signal of integrator 32, in subtracter 41 to yield the Stokes parameter estimate $s_1 = <A_v^2(t)> - <A_h^2(t)>$.

Stokes parameter $s_2$ is estimated as follows. The signals from transceiver output terminals 11a and 11b are multiplied in multiplier 42, yielding the product $A_h(t) \sin(\omega t + \phi_h(t)) A_v(t) \sin(\omega t + \phi_v(t)) = \frac{1}{2} A_v(t) A_h(t) [\cos(\phi_h(t) - \phi_v(t)) - \cos(2\omega t + \phi_v(t) + \phi_h(t))]$. Filter 43 filters out the term $\cos(2\omega t + \phi_v(t) + \phi_h(t))$, and the remaining term $\frac{1}{2} A_v(t) A_h(t) \cos(\phi_h(t) - \phi_v(t))$ is then multiplied by a factor of 4 in amplifier 44 to yield the expression $2 A_v(t) A_h(t) \cos(\phi_h(t) - \phi_v(t))$, which is related to the Stokes parameter $s_2$, previously defined in equation (6). The output signal from amplifier 44 is then applied to integrator 45 which performs the same function as integrators 40 and 32.

The estimation of Stokes parameter $s_3$ is performed in a manner similar to the estimation of $s_2$. The signal $E_v = A_v(t) \sin(\omega t + \phi_v(t))$ available at input terminal 12a is applied to phase shifter 46, the signal resulting being $A_v(t) \sin(\omega t + \phi_v(t) + \pi/2)$ which is equal to $A_v(t) \cos(\omega t + \phi_v(t))$. The output signals of phase shifter 46 and filter 30 are multiplied in multiplier 50 to yield the product $A_h(t) A_v(t)/2 [\sin(2\omega t + \phi_h(t) + \sin(\phi_h(t) - \phi_v(t))]$, which is then coupled to filter 51 which filters out the term $[\sin(2\omega t + \phi_h(t) + \phi_v(t))]$. After amplification in amplifier 52, the signal that results is equal to $2 A_v(t) A_h(t) (\sin(\phi_h(t) - \phi_v(t))$. Once again the signals are applied to an integrator 53 which performs the same function as integrator 32, 40 and 45, and the resulting output $<2 A_v(t) A_h(t) \sin(\phi_h(t) - \phi_v(t))>$ is equal to time averaged estimate of the Stokes parameters $s_3$.

The resulting estimated Stokes parameters $s_0$, $s_1$, $s_2$ and $s_3$ can then be applied to input terminals 54a, 54b, 54c and 54d, respectively, of threshold detector 54 wherein the four Stokes parameters may be analyzed in accordance with the detection criteria selected, compared to a predetermined threshold level, and a decision made concerning the nature of the illuminated object. The outcome of such decision may then be displayed on indicator 55.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A radar polarization detector comprising:
means adapted to receive electromagnetic signals having a plurality of signal components each having nonidentical predetermined polarizations for providing signals representative of said received signal components;
means coupled to said receiving means for processing said representative signals to establish time averages corresponding to said polarization of said signals and for providing signals representative of said time averages; and
means coupled to said processor means for comparing said parameter representative signals to predetermined threshold signals and for providing signals indicative of said time average representative signals having a signal level greater than said threshold signal.

2. An apparatus according to claim 1 wherein said received electromagnetic signals are quasimonochromatic.

3. An apparatus as recited in claim 1 wherein said receiving means comprises:
first antenna means responsive to a first predetermined polarization component of said electromagnetic signals;
second antenna means responsive to a second polarization component of said electromagnetic signals substantially orthogonal to said first predetermined polarization and further comprises:
means for generating linear frequency modulated signals;
means for coupling said generating means to said first and second antenna means whereby a linear FM signal is transmitted from and received by said first and second antenna means; and
first and second mixer means coupled respectively to said first and second antenna means and to said generator means for mixing a portion of said generated linear FM signals and said received linear FM signals, to provide first and second signals representative of said first and second polarization signal components, said representative signals coupled to said processing means.

4. An apparatus as recited in claim 3 wherein said receiving means further includes first and second frequency selection means coupled to receive said representative signals from said first and second mixing means respectively for selecting signals within a predetermined band.

5. An apparatus as recited in claim 3 wherein said receiving means further includes first means coupled between said generator means and said first antenna means for phase shifting signals.

6. An apparatus as recited in claim 3 wherein said receiving means further includes means coupled between said generator means and said first and second antenna means for varying the power coupled thereto.

7. An apparatus as recited in claim 1 wherein said processor means comprises:
first and second detecting means coupled to said receiving means for determining the amplitude of first and second representative signals received from said receiving means;
first and second means coupled respectively to said first and second detecting means for squaring signals received from said first and second detecting means and providing first and second squared signals;
means coupled to said first and second squaring means for subtracting said second squared signal from said first squared signal;
means coupled to said first and second squaring means for summing said first and second squared signals;
first multiplier means coupled to said receiving means for multiplying said first representative signal by said second representative signal;
second phase shifting means coupled to said receiving means for phase shifting said second representative signal by 90 degrees;
second means coupled to said second phase shifting means and further coupled to said receiving means for multiplying the signals from said second phase shifting means by said second representative signal;
first means coupled to said first multiplying means for amplifying said second means coupled to said second multiplying means for amplifying;
first integrator means coupled between said first squaring means and said summing and subtracting means for integrating signals;
second integrator means coupled between said second squaring means and said summing and subtracting means for integrating signals;
third integrator means coupled to said first amplifier means for integrating signals; and
fourth integrator means coupled to said second amplifier means for integrating signals.

8. An apparatus as recited in claim 7 wherein said processor means further includes:
third frequency selection means coupled between said first multiplier means and said first amplifier means for selecting frequencies within a predetermined band, and
fourth frequency selection means coupled between said second multiplying means and said second amplifier means for selecting frequencies within a predetermined band.

9. A method for detecting the presence of a radar target immersed in clutter comprising the steps of:

illuminating said radar target with electromagnetic radiation to provide a signal reflected from said target;

receiving electromagnetic radiation signal components of said reflected signal having predetermined nonidentical polarizations;

providing a signal representative of said signal components;

processing said representative signals to establish time averages corresponding to the polarization of said signal components and provide signals representative of said time averages; and comparing said time average representative signals to predetermined threshold signals to provide signals indicative of said time average representative signals having a signal level greater than said threshold signals.

10. A method as recited in claim 9 wherein the illuminating and received electromagnetic radiation is quasimonochromatic.

11. A method as recited in claim 9 wherein the received signal components comprise:

first signal components of said reflected signal having a first predetermined polarization; and second signal components of said representative signal having a second predetermined polarization substantially orthogonal to said first predetermined polarization.

12. A method as recited in claim 11 wherein the polarization corresponding time average signals are estimates of the Stokes parameters $s_0$, $s_1$, $s_2$ and $s_3$.

13. A method as recited in claim 13 wherein the step of processing comprises the steps of:

detecting the amplitude $A_v(t)$ of said first representative signal;

detecting the amplitude $A_h(t)$ of said second representative signal;

squaring said first and second amplitude detected signal to provide first and second squared signals;

subtracting said second squared signal from said first squared signal to determine the signal $A_h^2(t) - A_v^2(t)$;

adding said first and second squared signal to determine the signal $A_h^2(t) + A_v^2(t)$;

phase shifting said second representative signal by 90 degrees;

multiplying said phase shifted signal by said first representative signal;

filtering the product of said first representative signal and said phase shifted signal to select the term of the product corresponding to the sine of the phase difference of the first and second signal components;

amplifying said sine term by a factor of four whereby the signal $A_h(t)A_v(t) \sin(\phi_h(t) - \phi_v(t))$ is determined;

multiplying the first and second representative signals;

filtering the product of said first and second representative signals to select the term of the product corresponding to the cosine of the phase difference of the first and second signal;

amplifying said cosine term by a factor of four, whereby the signal $A_h(t)A_v(t) \cos(\phi_h(t) - \phi_v(t))$ is determined; and integrating the signals $A_h^2(t) + A_v^2(t)$, $A_h^2(t) - A_v^2(t)$, $A_h(t)A_v(t) \cos(\phi_h(t) - \phi_v(t))$, and $A_h(t)A_v(t) \sin(\phi_h(t) - \phi_v(t))$ to obtain estimates of the Stokes parameters $s_0$, $S_1$, $S_2$, and $s_3$, respectively.

* * * * *